(12) United States Patent
Orban et al.

(10) Patent No.: US 11,784,473 B2
(45) Date of Patent: Oct. 10, 2023

(54) ADJUSTABLE CABLE MANAGEMENT SYSTEM

(71) Applicant: SCHLUMBERGER TECHNOLOGY CORPORATION, Sugar Land, TX (US)

(72) Inventors: Jacques Orban, Katy, TX (US); Victor Garcia, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 687 days.

(21) Appl. No.: 16/772,317

(22) PCT Filed: Dec. 11, 2018

(86) PCT No.: PCT/US2018/064975
§ 371 (c)(1),
(2) Date: Jun. 12, 2020

(87) PCT Pub. No.: WO2019/118477
PCT Pub. Date: Jun. 20, 2019

(65) Prior Publication Data
US 2021/0083461 A1    Mar. 18, 2021

Related U.S. Application Data (60) Provisional application No. 62/597,468, filed on Dec. 12, 2017.

(51) Int. Cl.
*B61D 15/00* (2006.01)
*E21B 41/00* (2006.01)
(Continued)

(52) U.S. Cl.
CPC .......... *H02G 3/0456* (2013.01); *B61D 15/00* (2013.01); *E21B 41/0085* (2013.01); *H02G 7/00* (2013.01); *H02G 11/00* (2013.01); *E21B 12/00* (2013.01)

(58) Field of Classification Search
USPC ................................................ 307/9.1, 10.1
See application file for complete search history.

(56) References Cited

U.S. PATENT DOCUMENTS

| | | | |
|---|---|---|---|
| 5,538,207 A | 7/1996 | OConnell et al. | |
| 6,161,769 A * | 12/2000 | Kircher | F25C 3/04 239/14.2 |

(Continued)

FOREIGN PATENT DOCUMENTS

WO    2012162800 A1    12/2012

OTHER PUBLICATIONS

Office Action issued in the Russian Patent Appl. No. 2020122693 dated Feb. 15, 2022; 12 pages (with English Translation).

*Primary Examiner* — Rexford N Barnie
*Assistant Examiner* — Xuan Ly
(74) *Attorney, Agent, or Firm* — Kelly McKinney (57) ABSTRACT

Apparatus and methods pertaining to moving a train rig between locations associated with corresponding different wellsites. Equipment carried by the train rig is operable in conjunction with forming wells each extending beneath a corresponding one of the wellsites. An adjustable swing arm mechanically and electrically connected to the train rig comprises a medium-voltage (MV) cable. The adjustable swing arm extends from the train rig to connect the MV cable to one of a plurality of MV electrical hubs each electrically connected to a remote MV electrical power source via, at least, MV electrical lines suspended above the wellsites. A piece of equipment carried by the train rig is energized by MV electrical power delivered via the adjust- (Continued)

able swing arm, and then operated in conjunction with the subterranean well formation.

18 Claims, 8 Drawing Sheets

(51) Int. Cl.
*H02G 11/00* (2006.01)
*H02G 3/04* (2006.01)
*H02G 7/00* (2006.01)
*E21B 12/00* (2006.01)

(56) References Cited

U.S. PATENT DOCUMENTS

| | | |
|---|---|---|
| 2011/0214882 A1 | 9/2011 | Santos |
| 2011/0252921 A1 | 10/2011 | Nakagiri et al. |
| 2013/0315676 A1* | 11/2013 | Orgeron ............ F16L 3/015 |
| | | 405/184.4 |
| 2015/0047290 A1 | 2/2015 | Konduc |
| 2015/0096952 A1 | 4/2015 | Hall et al. |
| 2019/0093382 A1* | 3/2019 | Sauber ............ E04H 12/187 |

\* cited by examiner

ADJUSTABLE CABLE MANAGEMENT SYSTEM

CROSS-REFERENCE TO RELATED APPLICATIONS

This application claims priority to and the benefit of U.S. Provisional Application No. 62/597,468, titled "Adjustable Cable Management System (Swing Arm)," filed Dec. 12, 2017, the entire disclosure of which is hereby incorporated herein by reference.

BACKGROUND OF THE DISCLOSURE

In the drilling of oil and gas wells, drilling rigs are used to create a well by drilling a wellbore into a formation to reach oil and gas deposits. During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various components of a drilling rig can be used to advance the drillstring into the formation. In some applications, several wells may be drilled on the same pad with limited separation distance. In such applications, a train rig containing the drilling rig and other assorted drilling equipment may be moved to above each well to be drilled during the process of constructing multiple wells, but the power connections, being stationary, are disconnected each time the train rig moves and reconnected at the next successive wellsite. However, the power connections may be maintained during rig movement via use of a cable spooling reel, instead of repeated disconnection and reconnection with each rig movement. The spooling reel and related equipment, however, are prohibitively large on an otherwise crowded train rig. Use of such spooling reel also mandates that the cable be insulated, as well as redundant cables for reliability, which also increases costs.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes an adjustable swing arm mechanically and electrically connected to a train rig. The train rig is operable in conjunction with the formation of a subterranean well extending beneath one of multiple wellsites. The adjustable swing arm is extendable to different lengths between the train rig and at least one of multiple medium-voltage (MV) electrical hubs. Each MV electrical hub is electrically connected to a remote MV electrical power source via, at least, MV electrical lines suspended above the wellsites. The adjustable swing arm includes conduit tubes connected end-to-end and rotatable relative to each other to extend to the different lengths. The adjustable swing arm also includes an electrical cable carried by the conduit tubes for delivering MV electrical power from a connected one of the MV electrical hubs to the train rig.

The present disclosure also introduces a method that includes conveying a train rig between locations associated with corresponding different ones of wellsites. Equipment carried by the train rig is operable in conjunction with forming wells each extending beneath a corresponding one of the wellsites. An adjustable swing arm mechanically and electrically connected to the train rig includes an MV cable. The method also includes extending the adjustable swing arm from the train rig to connect the MV cable to one of multiple MV electrical hubs each electrically connected to a remote MV electrical power source via, at least, MV electrical lines suspended above the wellsites. The method also includes operating a piece of equipment carried by the train rig and energized by MV electrical power delivered via the adjustable swing arm.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Figure 1:
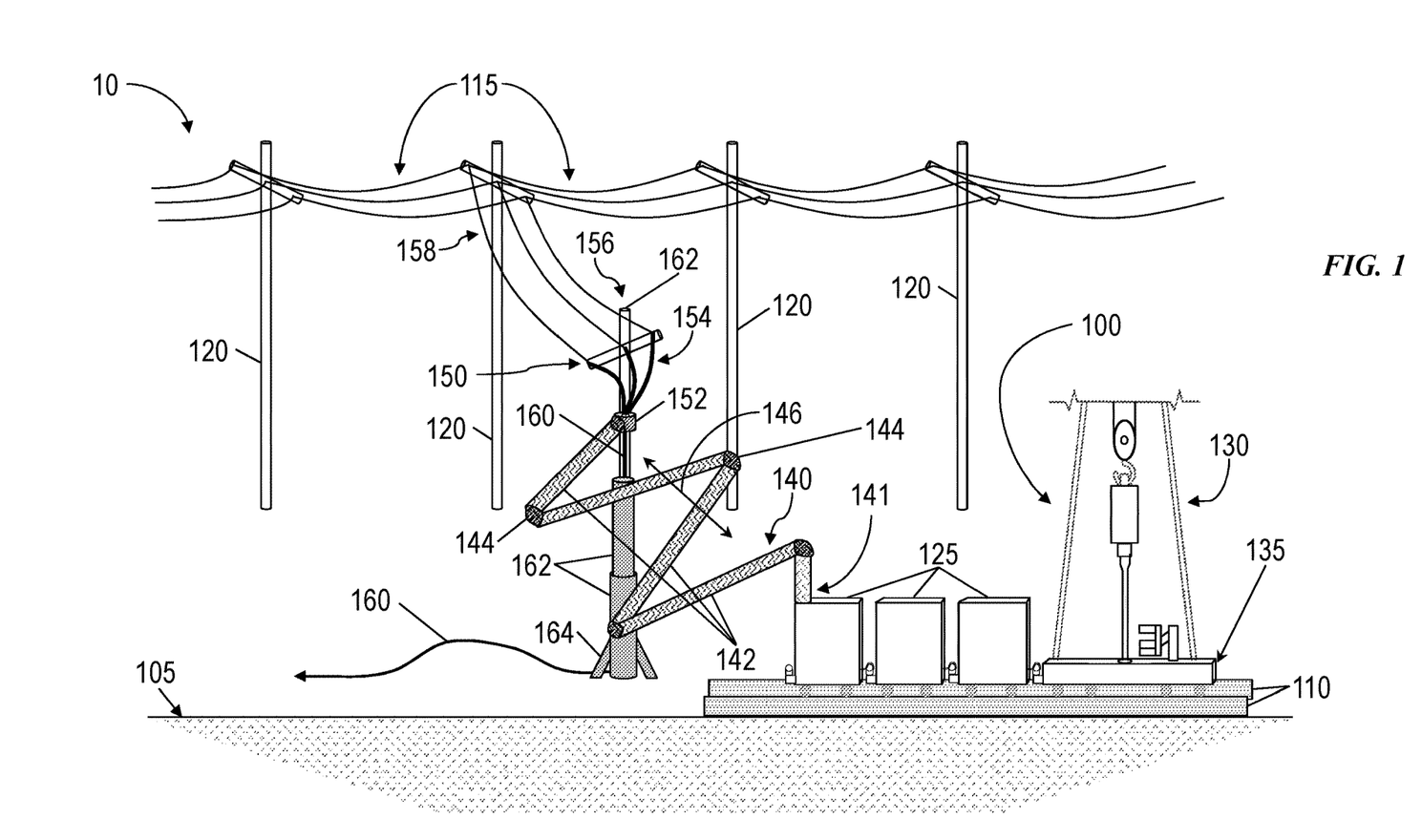
FIG. 1 is a schematic side/perspective view of at least a portion of an example implementation of apparatus according to one or more aspects of the present disclosure.

FIG. 1 is a schematic side/perspective view of at least a portion of an example implementation of an adjustable cable management system 10 for supplying electricity to a train rig 100 according to one or more aspects of the present disclosure. The train rig 100 may travel on the ground surface 105 of a multiple-wellsite area by rolling along tumbas or rails 110, or by other conveyance means capable of transporting a relatively heavy rig platform and its associated equipment between wellsites. The tumbas or rails 110 may distribute the relatively large load to the ground surface 105, which may otherwise be a difficult ground surface on which to transport such a relatively large load (e.g., marsh, sand, etc.).

An MV power source (not shown) may supply MV power proximal to the tumbas/rails 110 and the train rig 100. For example, such power delivery may be via one or more uninsulated MV wires 115 supported overhead by a series of transmission towers 120. The MV power supplied to the train rig 100 may be in the form of three-phase, alternating current (AC) power. In such implementations (among others within the scope of the present disclosure), the power may be delivered via three of the uninsulated MV wires 115 corresponding to the three phases. However, other implementations are also within the scope of the present disclosure, including other numbers of phases, other numbers of wires 115, etc.

The train rig 100 may contain one or more movable equipment assemblies 125, which may include various equipment to assist in wellsite construction, production (e.g., of a subterranean resource), and/or maintenance, inter alia. The train rig 100 may also contain a drilling rig 130 operable for drilling one well or a series of wells at one or more wellsites located along or proximate the path created by the tumbas/rails 110. The drilling rig 130 is movable via a movable drilling rig platform 135, which may be separate from or coupled with the equipment assemblies 125. The drilling rig 130 is operable for drilling into the subterranean formation(s) beneath the ground surface 105 and/or otherwise forming the well(s) at the wellsite(s).

Each movable equipment assembly 125 is of a form permitting movability in tandem with the drilling rig 130 and its platform 135, such as containers, platforms, housings, or the like, or a combination thereof. One or more of the movable equipment assemblies 125, the movable platform 135, and the drilling rig 130 may (individually or collectively in various combinations) comprise various equipment for subterranean drilling, fracturing, completion, production, and/or maintenance (e.g., workover) operations, such as operations control systems, drilling fluid ("mud") circulation equipment (e.g., pumps, shakers, degassers, etc.), drawworks, power distribution equipment, pipe-/casing-handling equipment, fracturing fluid circulation equipment, and/or other equipment.

The train rig 100 may comprise a prime mover operable to move the train rig 100 between locations associated with different wellbores at the wellsite(s). For example, one of the movable equipment assemblies 125 may be or comprise the prime mover, such as may be implemented as a train engine, tractor, and/or the like. The MV electrical power delivered to the train rig 100 may be utilized to electrically power the prime mover, although the prime mover may instead be electrically powered otherwise. The prime mover may instead be implemented via diesel, gasoline, natural gas, and/or other types of engines.

Electrically-driven pieces of such equipment are electrically powered from the stationary MV power source via an adjustable swing arm 140. The adjustable swing arm 140 is anchored to and extendable from the one of the movable equipment assemblies 125 (or the drilling rig 130). The adjustable swing arm 140 carries one or more electrical cables detachably connectable to a power junction/power connector 150. The power junction/power connector 150 may be attached to the MV power lines 115, such as at one of the transmission towers 120. Thus, electrical power is delivered from the stationary MV power source to the equipment of the train rig 100 via the MV power lines 115, the power junction/power connector 150, the adjustable swing arm 140, and perhaps other electrical conductors (such as cables 154, 158 in the example implementation depicted in FIG. 1). To account for the transmission towers 120 and the MV power lines 115 being stationary and the train rig 100 being movable, the adjustable swing arm 140 is extendable outward from the train rig 100. Such extension may be along a direction 146, reflecting a position toward the overhead MV power lines 115 and, perhaps, a selected one of the transmission towers 120.

The adjustable swing arm 140 may comprise conduit tubes 142 and conduit elbows or joints (pivots) 144 through which the one or more MV cables extend. The adjustable swing arm 140 may also comprise one or more low-voltage (LV) cables extending through the conduit tubes 142 and the conduit elbows or joints (pivots) 144, such as for electrically connecting the equipment of the train rig 100 with a stationary LV power source. However, for the sake of clarity in FIG. 1, the MV and LV cables are not shown within the conduit tubes 142 and the conduit elbows or joints (pivots) 144.

The terms "medium-voltage" and "low-voltage" are well understood in the art of heavy-duty oil and gas drilling rigs. MV may generally be regarded as being above 1000 volts AC (VAC), and LV may generally be regarded as being below 1000 VAC. For the sake of example, MV may be approximately 4160 VAC and LV may be approximately 600 VAC. However, in the context of the present disclosure, "medium-voltage" power cables can be rated to carry electricity having a voltage from above 1,000 VAC to about 100,000 VAC, e.g., from about 1,100 VAC to about 70,000 VAC, from about 2,000 VAC to about 50,000 VAC, or from about 2,400 VAC to about 35,000 VAC, and "low-voltage" power cables can be rated to carry electricity having a voltage up to 1,000 VAC, e.g., up to about 800 VAC, up to about 750 VAC, up to about 700 VAC, up to about 650 VAC, or up to about 600 VAC. The medium- and/or low-voltage power may be direct current (DC) instead of AC. The MV lines 115 may be suspended overhead (e.g., via the transmission towers 120) because they are uninsulated, such as in implementations in which insulated cable is overly expensive. However, the MV lines 115 may instead be insulated and/or may be situated at ground-level or otherwise not overhead. Also, due to reflected waves, for example, LV cables may use 2000 V insulation, such as in VFD implementations, such that the cables could be rated to 2000 V.

Each conduit tube 142 may be an elongated, substantially hollow member of substantially constant cross-sectional shape, which may be substantially circular, elliptical, square, rectangular, triangular, or otherwise shaped. However, one or more of the conduit tubes 142 may instead be a rack, a tray, or another open support structure that may not generally be tubular. For the sake of simplicity in the description below, however, such tubular and non-tubular implementations are collectively referred to below as a conduit tube, it being understood that one or more of the conduit tubes 142 (and conduit tubes described below) may not actually be tubular.

Moreover, although the adjustable swing arm 140 is shown in FIG. 1 as connecting to the train rig 100 at a connection point 141 on one of the movable equipment assemblies 125, the connection point 141 may be at other positions on the train rig 100. The connection point 141 may be located on one of the movable equipment assemblies 125 that contains a power skid and/or a control skid, on others of the movable equipment assemblies 125, or on the movable platform 135. The connection point 141 may itself be movable to different positions along the train rig 100. The train rig 100 may include more than one electrical connection point 141 possible for connecting to MV and/or LV electrical power.

The adjustable swing arm 140 can thus convey at least MV electrical power from the overhead MV power lines 115 via at least one of a plurality of MV power junctions, power connectors, and/or other electrical hubs, collectively referred to herein as the MV electrical hubs 150. Each MV electrical hub 150 may include or be an adjustable swing arm junction 152, which is shown in FIG. 1 as being attached to the adjustable swing arm 140 as a conduit joint similar to the conduit elbows or joints 144, e.g., for flexibility in connection of the MV and/or LV cables within the adjustable swing arm 140. The adjustable swing arm 140 may also convey LV electrical power to the connection point 141. For example, the hubs 150 may be operable to transform the MV AC power to LV AC or DC power, or the hubs 150 may receive LV power in a manner similar to the receipt of the MV power, and in either case the hubs 150 may be operable to transmit both MV and LV power to the cables of the adjustable swing arm 140. The adjustable swing arm 140 may also carry one or more cables (not shown) for transmitting electronic communications and/or control systems to/from the train rig 100 (e.g., which may also connect at the adjustable swing arm junction 152).

As depicted in the example implementation depicted in FIG. 1, the MV electrical hub 150 may also include or be connected with insulated MV cables 154, which may connect the MV cables in the adjustable swing arm 140 to uninsulated MV cables 158 on a portable transmission tower 156. The uninsulated MV cables 158 may connect to the MV power lines 115 on one of the transmission towers 120. As mentioned above, the MV electrical hub 150 may also permit connection to an LV electrical source, e.g., at the adjustable swing arm junction 152, such as via an LV (perhaps insulated) cable 160. The MV electrical hub 150 may include circuitry and/or other means for converting three-phase, MV, AC power to three-phase, LV, AC power, or to other AC or DC power, such as to distribute LV power to the LV cable(s), when present.

The portable transmission tower 156 is an optional feature. The portable transmission tower 156 may be vertically telescopic, such as via a plurality of telescoping sections 162. The portable transmission tower 156 may comprise various support and/or stability means, such as a tower support base 164, which may be optionally at least partially retractable. The train rig 100 may comprise a platform or other structure (not shown) where the portable transmission tower 156 may be stored when not utilized. Such structure may include or be its own movable equipment assembly 125, or may be a portion of another movable equipment assembly 125 on the train rig 100.

The adjustable swing arm 140 may include means for permitting the removal of snow and/or ice buildup during cold weather use. Such snow/ice removal means may comprise one or more resistive heating elements disposed within, on, and/or near each conduit tube 142 and/or one or more (or each) of the conduit pivots/joints/elbows 144. The snow/ice removal means may also or instead comprise tubing, channels, and/or other passageways for conducting warm/hot water, other liquid, steam, or other gas through, over, and/or near each conduit tube 142 and/or one or more (or each) of the conduit pivots/joints/elbows 144. The snow/ice removal means may also or instead comprise a mechanically or pneumatically operated device operable to continuously and/or intermittently sweep off surfaces of the conduit tubes 142 and/or one or more (or each) of the conduit pivots/joints/elbows 144, such as in a manner similar to a windshield wiper. The snow/ice removal means may be remotely controllable, such as from the train rig 100, from a site remote from the cable management system 10, and/or remotely from the wellsites. The adjustable swing arm 140 may include a strain gauge or other sensor to measure a weight of the adjustable swing arm 140 and/or a displacement caused by the weight of the adjustable swing arm 140, and, either automatically at a given weight and/or displacement or manually through a decision from an educated assessment of conditions, the snow and/or ice removal process may be initiated.

Figure 2:
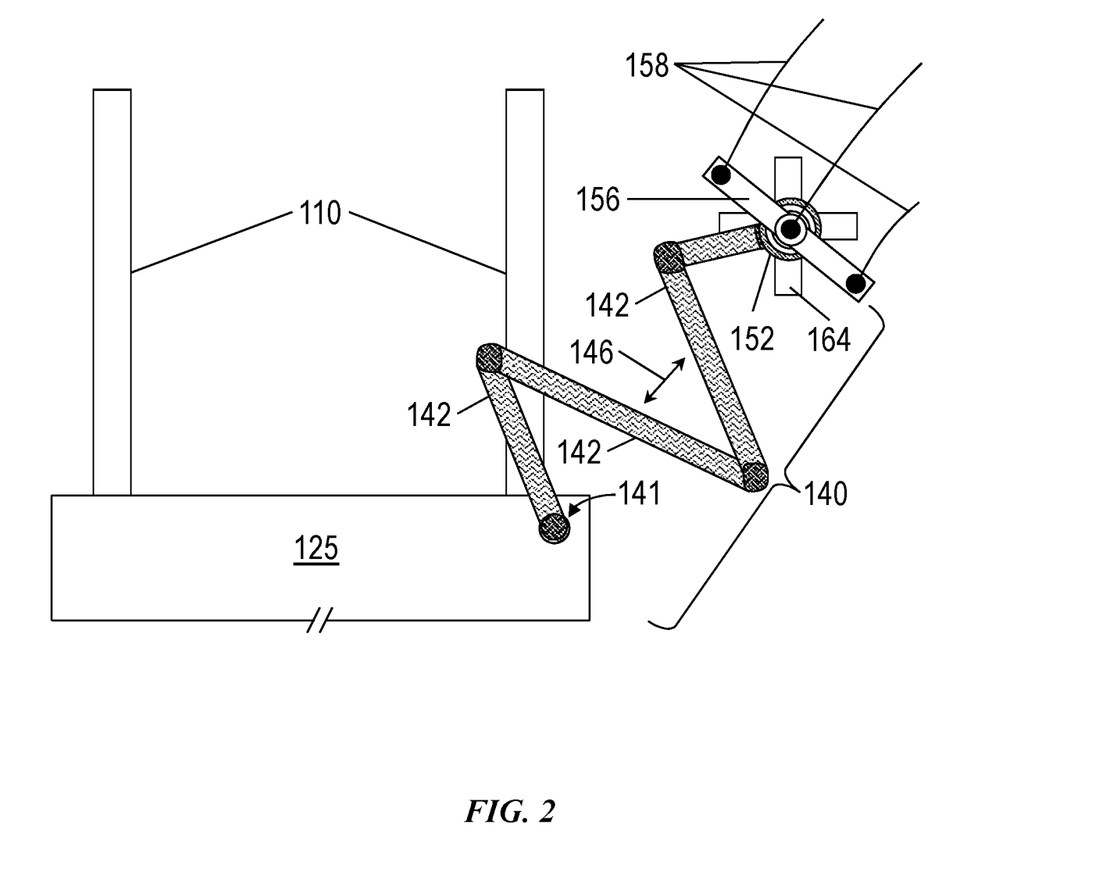
FIGS. 2 and 3 are schematic top views of at least a portion of the apparatus shown in FIG. 1.
Figure 3:
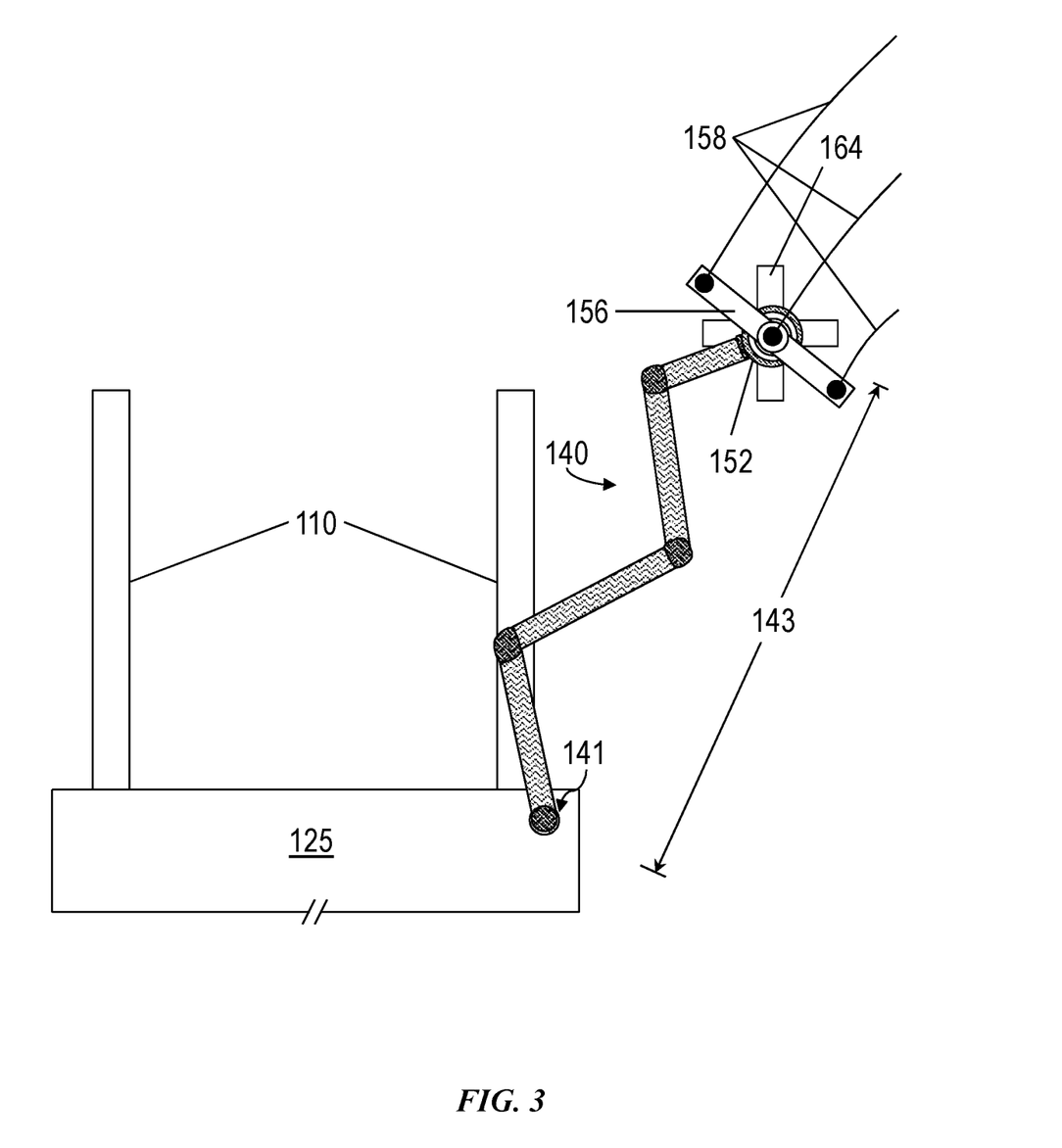

FIGS. 2 and 3 are top views of at least a portion of the example implementation shown in FIG. 1. The following description is applicable to FIGS. 1-3, collectively.

In FIGS. 1-3, the end movable equipment assembly 125 of the train rig 100 contains the connection point 141 for the adjustable swing arm 140. In FIG. 3, the adjustable swing arm 140 is extended further away from the connection point 141 than in FIG. 2. In both FIGS. 2 and 3, the adjustable swing arm junction 152 is disposed on the portable transmission tower 156 of the MV electrical hub 150. As described above with respect to FIG. 1, the tower support base 164 mechanically stabilizes the portable transmission tower 156 to maintain MV electrical connection with the uninsulated MV cables 158 and, ultimately, with the overhead MV power lines 115 (not shown in FIGS. 2 and 3).

In FIG. 2, the conduit tubes 142 have been rotated relative to each other within a plane to yield a relatively compressed configuration of the adjustable swing arm 140. The plane may be approximately parallel to the ground surface 105. In this context, "approximately parallel" may mean deviating from average ground level (e.g., the XY plane of the page in FIG. 2) by not more than about five, ten, or fifteen degrees, depending on the particular implementation. The connection point 141 may include an adjustable extension conduit (not labeled) and/or other means for adjusting the vertical position (i.e., height) of the adjustable swing arm 140 in a direction extending perpendicular to the plane in which the conduit tubes 142 rotate (e.g., raising/lowering the adjustable swing arm 140 in the Z-axis direction extending into and out of the page in FIG. 2) such that the extendibility direction 146 of the adjustable swing arm 140 may be approximately parallel to the ground.

The conduit elbows or joints 144 permit each cable within the conduit tubes 142 of the adjustable swing arm 140 to bend without exceeding the bend radius of the cable. Although not shown, pivot stops and/or other means associated with the conduit elbows/joints 144 and/or other components of the adjustable swing arm 140 may prevent relative rotation of the conduit tubes 142 from exceeding predetermined ranges of rotation, which may also aid in ensuring that the bend radius of each cable within the adjustable swing arm 140 is not exceeded.

In FIG. 3, the adjustable swing arm 140 is further extended from the connection point 141, relative to the configuration shown in FIG. 2, such that the adjustable swing arm junction 152 on the portable transmission tower 156 of the medium-voltage electrical hub 150 is disposed relatively further from the connection point 141. The configuration shown in FIG. 3 may represent the maximum extension of the adjustable swing arm 140. When fully extended, the adjustable swing arm 140 may span a distance 143 of about forty meters. However, other maximum values of the extension distance 143 are also within the scope of the present disclosure, such as about 20 meters, 25 meters, 30 meters, 35 meters, and others, depending on the number of wells to be drilled at a given wellsite, the distance between those wells, and/or other factors.

The adjustable swing arm 140 may include a position sensor, an angle sensor, a strain gauge, and/or another type of sensor utilized for determining of the current extension distance 143 of the adjustable swing arm 140. The current extension distance 143 may be utilized to determine whether the adjustable swing arm 140 is near a predetermined extension limit. When the adjustable swing arm 140 is at maximum extension, or perhaps when extended to within a predetermined amount of the maximum extension (e.g., about 90% of the maximum extension), a process may be initiated for disconnecting the electrical connections and retracting the adjustable swing arm 140 in preparation for moving and reconnection. Such process may be initiated automatically and/or manually based on knowledge of how far and in which direction the train rig 100 will be moving next.

Figure 4:
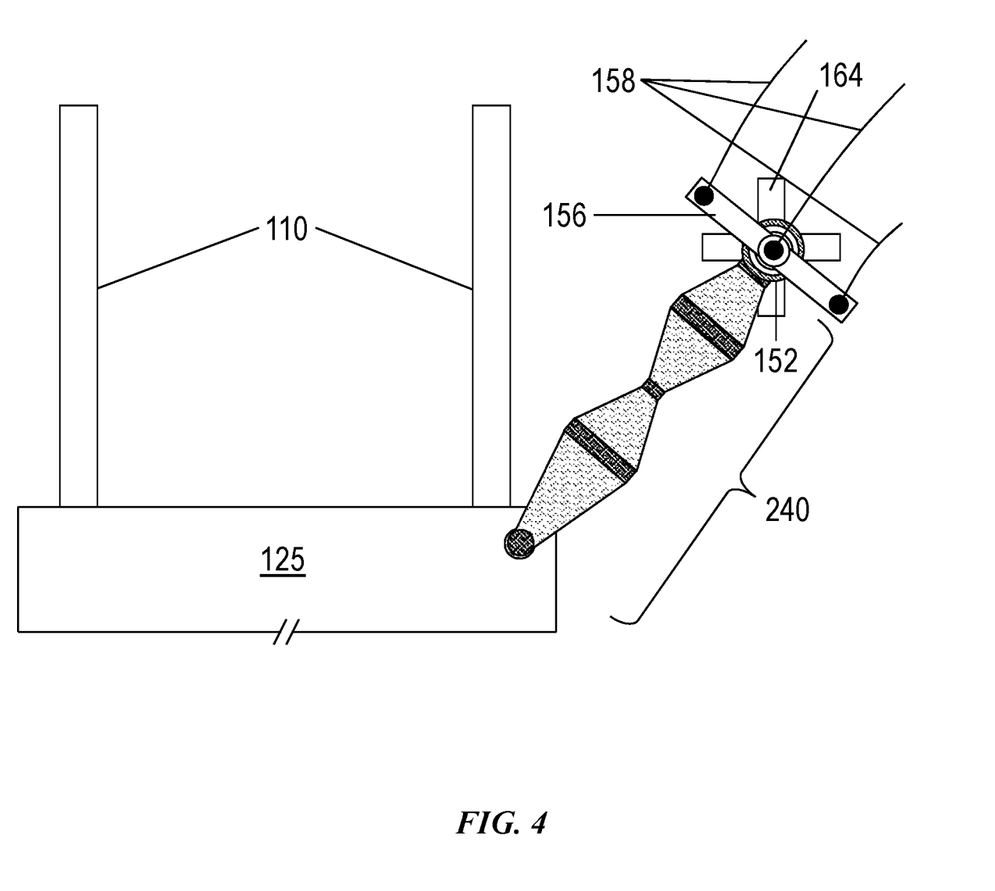
FIGS. 4 and 5 are schematic top views of at least a portion of another example implementation of the apparatus shown in FIGS. 2 and 3 according to one or more aspects of the present disclosure.
Figure 5:
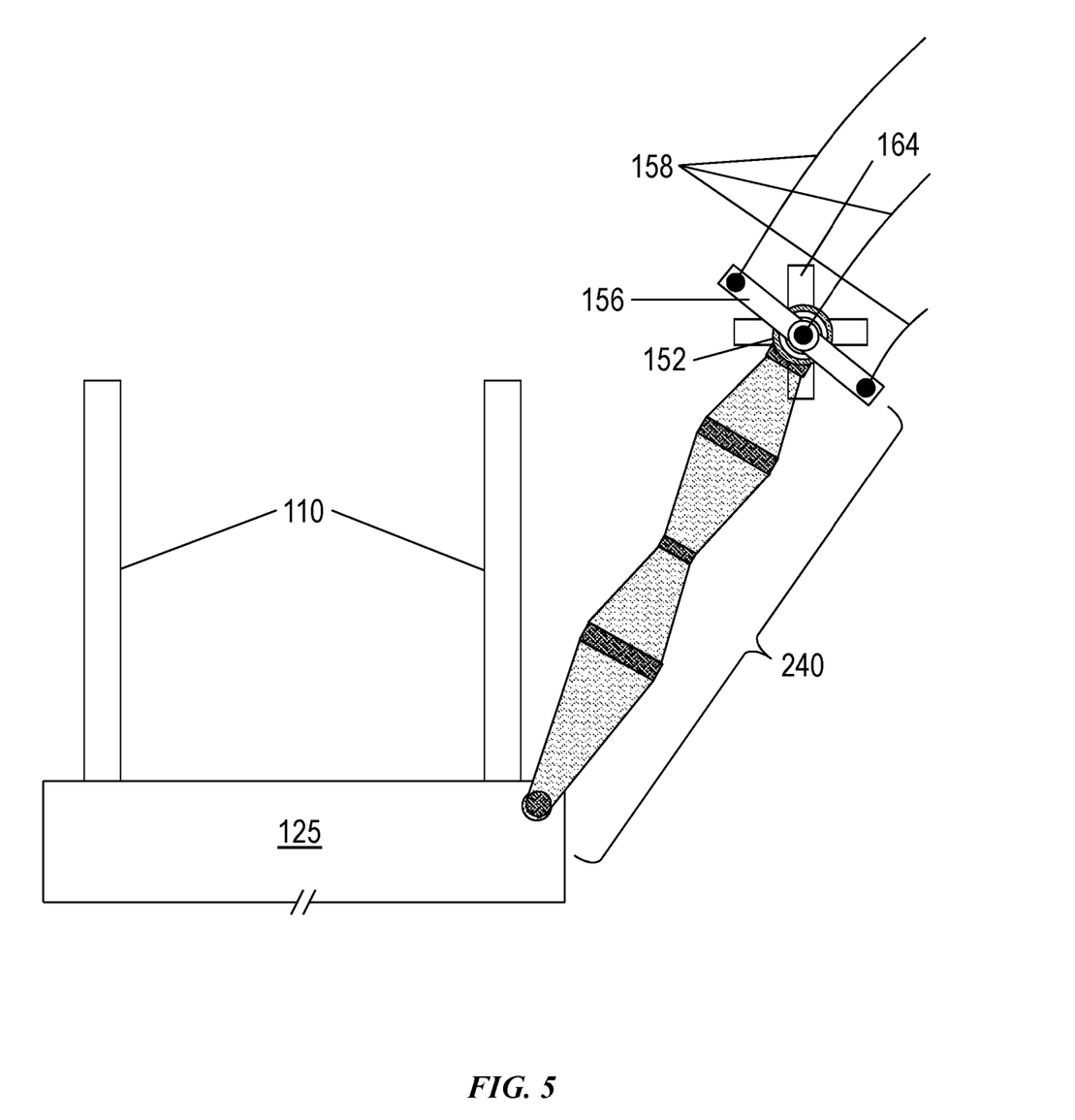

FIGS. 4 and 5 are top views of at least a portion of another example implementation of the adjustable cable management system 10 shown in FIGS. 1-3, designated in FIGS. 4 and 5 as the adjustable cable management system 20. The adjustable cable management system 20 shown in FIGS. 4 and 5 is similar (or identical) to the adjustable cable management system 10 shown in FIGS. 1-3, with the possible exceptions described below.

The adjustable cable management system 20 comprises an adjustable swing arm 240 that is similar (or identical) to the adjustable swing arm 140 of the adjustable cable management system 10. However, the conduit tubes 242 of the adjustable swing arm 240 rotate relative to each other in a plane that is approximately perpendicular to the ground surface 105 and the plane of rotation of the conduit tubes 142 of the adjustable swing arm 140 shown in FIGS. 1-3. In this context, "approximately perpendicular" may mean deviating by not more than about five, ten, or fifteen degrees from being perpendicular to average ground level, or not more than about five, ten, or fifteen degrees from the Z-axis extending into and out of the page in FIG. 4, depending on the particular implementation. Thus, although the conduit tubes 242 and conduit elbows 244 have generally similar cross-sectional shapes and dimensions in FIGS. 4 and 5, they appear to have different cross-sectional shapes and dimensions in FIGS. 4 and 5 because, for example, one end of each conduit tube 242 appears smaller than the other end of that conduit tube 242 because the apparently smaller end is closer to the ground surface 105 than the apparently larger end.

As described above, the connection point 141 may include an adjustable extension conduit (not labeled) and/or other means for adjusting the vertical position of the adjustable swing arm 140. Such adjustment may be to ensure sufficient clearance of the adjustable swing arm 240 relative to the ground surface 105 such that, even when fully retracted/compressed, no part of the adjustable swing arm 240 touches the ground surface 105. Such adjustment may also or instead be to maintain a predetermined distance (e.g., about three meters) between the adjustable swing arm 240 and the ground surface 105, such as to permit personnel to safely pass beneath the adjustable swing arm 240.

Figure 6:
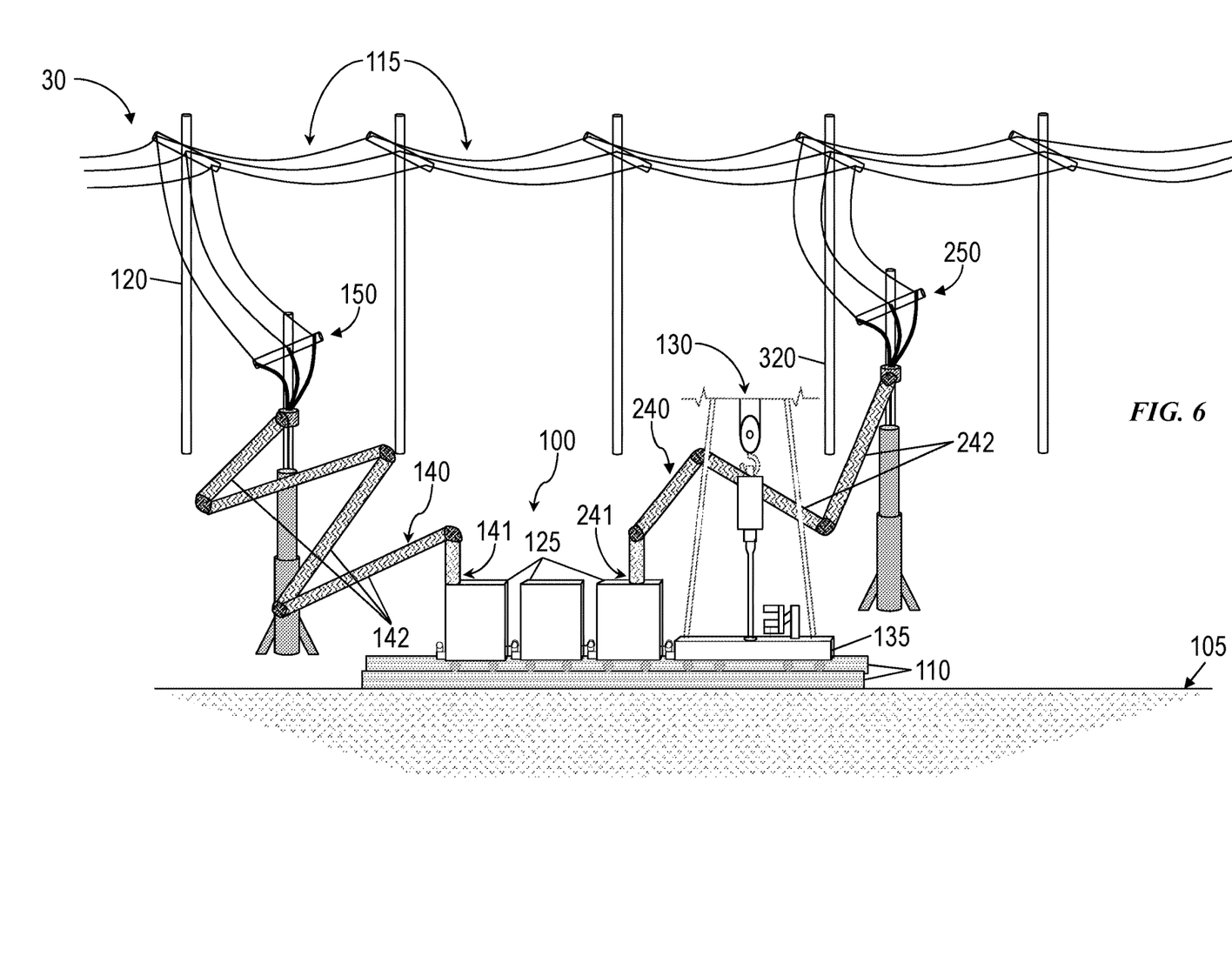
FIG. 6 is a schematic side/perspective view of at least a portion of an example implementation of apparatus according to one or more aspects of the present disclosure.

FIG. 6 is a schematic side/perspective view of at least a portion of another example implementation of the adjustable cable management system 10, 20 according to one or more aspects of the present disclosure, designated in FIG. 6 as the adjustable cable management system 30. The adjustable cable management system 30 depicted in FIG. 6 has one or more aspects in common with the adjustable cable management system 10 shown in FIGS. 1-3, or the adjustable cable management system 20 shown in FIGS. 4 and 5, or is otherwise similar (or identical) to the adjustable cable management system 10/20 shown in FIGS. 1-5 except as described below.

For example, in the adjustable cable management system 30, the train rig 100 can be connected to the MV power source by virtue of an instance of the adjustable swing arm 140 shown in FIGS. 1-3 and an instance of the adjustable swing arm 240 shown in FIGS. 4 and 5. The adjustable swing arm 140 may be attached to the power junction/power connector 150, which is attached to the overhead MV power lines 115 at one of the transmission towers 120. Similarly, the adjustable swing arm 240 may be attached to another instance of the power junction/power connector 150, designated in FIG. 6 as the power junction/power connector 250, which is attached to the overhead MV power lines 115 at a different transmission tower 120, designated in FIG. 6 as the transmission tower 320.

In the implementation depicted in FIG. 6, the conduit tubes 142 of the adjustable swing arm 140 rotate within a plane approximately parallel to the ground surface 105 (as shown in FIGS. 1-3), and the conduit tubes 242 of the adjustable swing arm 240 rotate within a plane approximately perpendicular to the ground surface 105. However, in other implementations within the scope of the present disclosure, such planes of rotation of the conduit tubes 142, 242 may both be approximately parallel to the ground surface 105 or both approximately perpendicular to the ground surface 105.

The adjustable swing arms 140, 240 may be simultaneously provide electrical power to the train rig 100, such as to provide redundancy in electrical power delivery to the train rig 100, and may be simultaneously detached when the train rig 100 moves to another wellsite. For example, both adjustable swing arms 140, 240 may simultaneously provide MV electrical power, and one or both adjustable swing arms 140, 240 may provide LV electrical power. However, the adjustable swing arms 140, 240 may cooperatively deliver electrical power to the train rig 100 during the duration of the drilling activities at the wellsites, such as by detaching one adjustable swing arm at a time when that adjustable swing arm reaches (or nears) maximum extension while leaving the other adjustable swing arm connected to the power source(s) until the detached adjustable swing arm can be reconnected, thereby providing approximately continuous electrical power delivery to the train rig 100.

As depicted in FIG. 6, the adjustable swing arms 140, 240 may connect to the train rig 100 at two connection points 141, one of which is designated in FIG. 6 as connection point 241. The connection points 141, 241 may be similar, or identical, and may be located on the same or different ones of the movable equipment assemblies 125. One or both of the connection points 141, 241 may also or instead be located on the movable platform 135, the drilling rig 130, and/or other locations. Also, although the train rig 100 is represented with the movable equipment assemblies 125 on one end and the movable platform 135 with the drilling rig 130 on the other end, one or more movable equipment assemblies 125 may be on either side of the movable platform 135, including instances of the movable equipment assemblies 125 carrying one or both of the connection points 141, 241, such that the connection points 141, 241 may be located at either end of the train rig 100, thereby providing flexibility in establishing the electrical power delivery connections.

Figure 7:
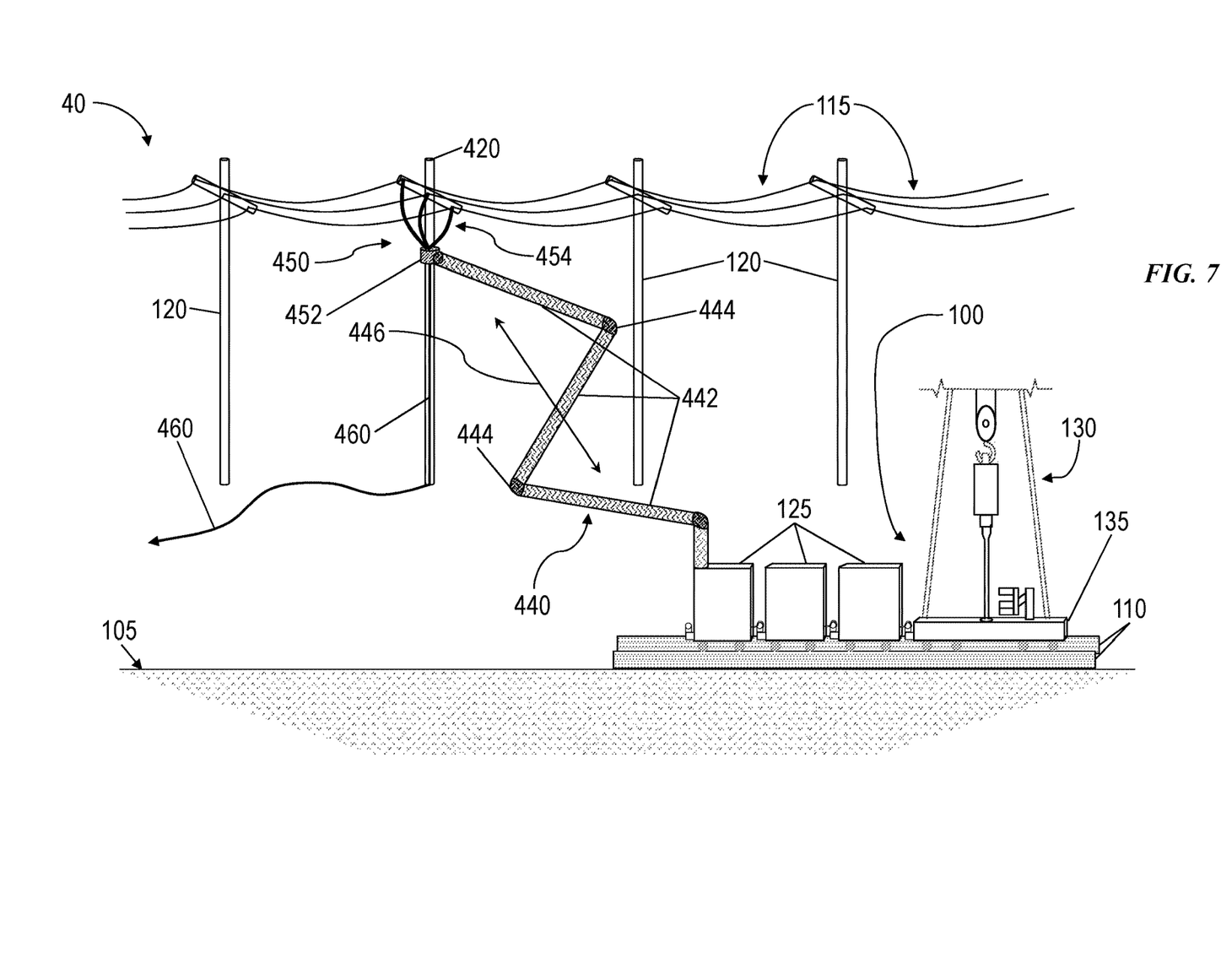
FIG. 7 is a schematic side/perspective view of at least a portion of an example implementation of apparatus according to one or more aspects of the present disclosure.

FIG. 7 is a schematic side/perspective view of at least a portion of another example implementation of the adjustable cable management system 10, 20 according to one or more aspects of the present disclosure, designated in FIG. 7 as the adjustable cable management system 40. The adjustable cable management system 40 depicted in FIG. 7 is the same or similar to the adjustable cable management system 10 shown in FIGS. 1-3, or to the adjustable cable management system 20 shown in FIGS. 4 and 5, except as described below.

For example, the adjustable cable management system 40 includes an instance of the adjustable swing arm 140, designated in FIG. 7 as the adjustable swing arm 440. As with the adjustable swing arms 140, 240 in FIGS. 1-5, the adjustable swing arm 440 can convey at least MV electrical power (and optionally also LV electrical power) from the overhead MV power lines 115 via at least one of a plurality of MV electrical hubs 450. The MV electrical hub (power junction/power connector) 450 may be the same as or similar to the MV electrical hubs 150 described above, and may thus include or be an adjustable swing arm junction 452, which is shown in FIG. 7 as being attached to the adjustable swing arm 440 as a conduit joint similar to the conduit elbows or joints 444, e.g., for flexibility in connection for the MV and/or LV cables within the adjustable swing arm 440. However, unlike the MV hubs 150 shown in FIG. 1 and described above, the MV electrical hub 450 shown in FIG. 7 is located directly on one of the transmission towers 120, designated in FIG. 7 as the transmission tower 420, supporting the overhead, uninsulated, MV power lines 115. The MV electrical hub 450 also includes insulated MV cables 454, which may connect the MV cables in the adjustable swing arm 440 to the overhead MV power lines 115.

Additionally, or alternatively, the MV electrical hub 450 or the adjustable swing arm junction 452 may include circuitry or other appropriate means for at least partially converting three-phase MV AC power delivered in the MV electrical wiring to three-phase LV AC or LV DC), such as to feed LV electrical power to the LV cable(s), when present.

Although not shown in FIG. 7, there may be multiple adjustable swing arm junctions 452 disposed on some or each of the transmission towers 120, 420. Alternatively, a single adjustable swing arm junction 452 may be attached to the end of the adjustable swing arm 440, and the adjustable swing arm junction 452 may include a mechanism for releasably but securely attaching to a relevant transmission tower 420, at which point the insulated MV cables 454 may be placed to connect the overhead MV power lines 115 to the cables within the adjustable swing arm 440 through the securely connected swing arm junction 452. The mechanism may include one or more snap fit connections, hooking connections, tab and slot connections, interference fit connections, latching connections, groove fit connections, and/or combinations thereof, among other examples also within the scope of the present disclosure.

Figure 8:
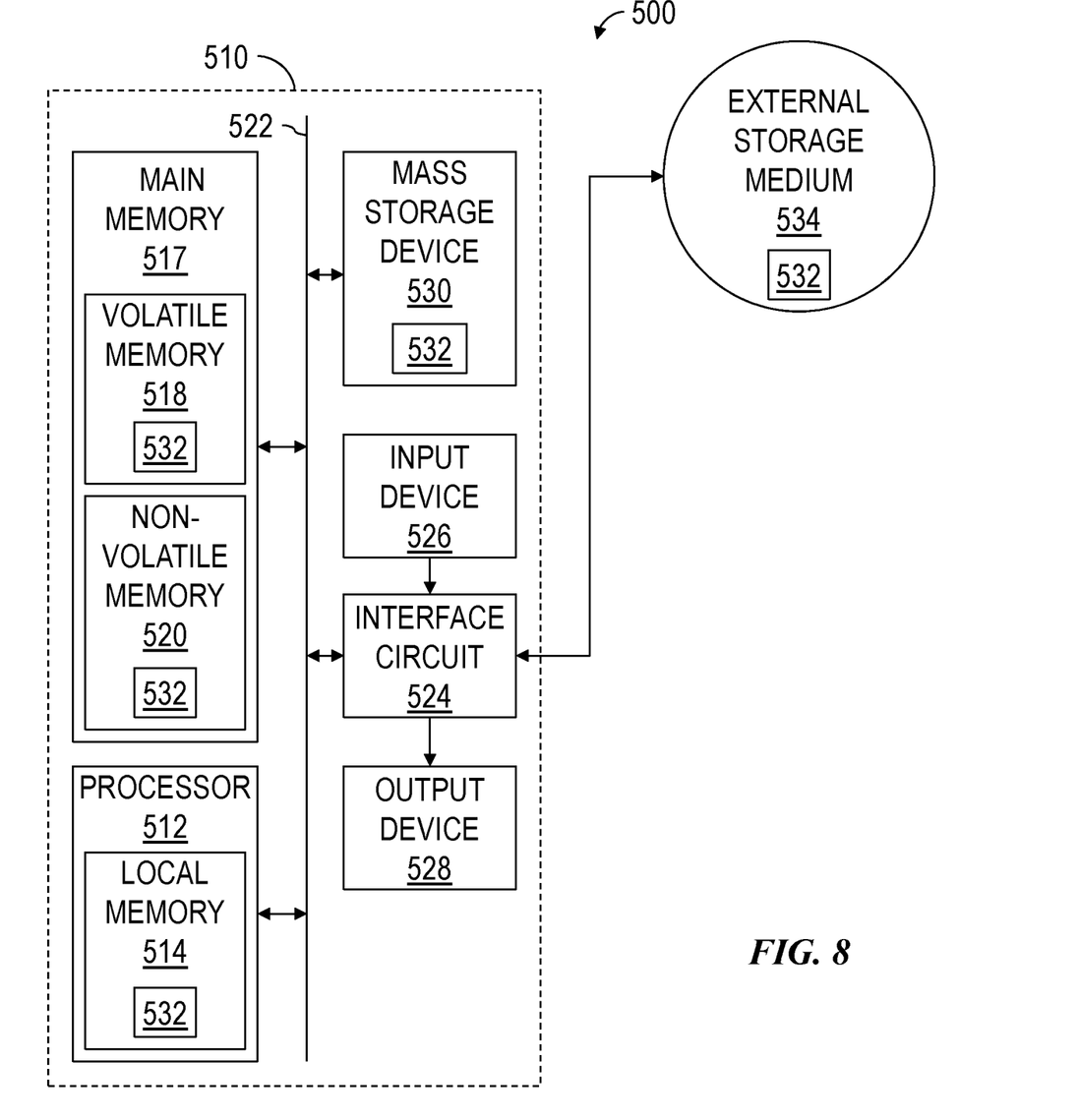
FIG. 8 is a schematic view of at least a portion of an example implementation of apparatus according to one or more aspects of the present disclosure.

FIG. 8 is a schematic view of at least a portion of an example implementation of a processing system 500 according to one or more aspects of the present disclosure. The processing system 500 may execute example machine-readable instructions to implement at least a portion of one or more of the methods and/or processes described herein, and/or to implement a portion of one or more of the example downhole tools described herein. The processing system 500 may be or comprise, for example, one or more processors, controllers, special-purpose computing devices, servers, personal computers, personal digital assistant (PDA) devices, smartphones, internet appliances, and/or other types of computing devices. One or more controllers for operating one or more pieces of equipment on the train rig 130 may be implemented by one or more instances of at least a portion of the processing system 500.

The processing system 500 may comprise a processor 512, such as a general-purpose programmable processor, for example. The processor 512 may comprise a local memory 514, and may execute program code instructions 532 present in the local memory 514 and/or another memory device. The processor 512 may execute, among other things, machine-readable instructions or programs to implement the methods and/or processes described herein. The programs stored in the local memory 514 may include program instructions or computer program code that, when executed by an associated processor, cause a controller and/or control system implemented in surface equipment and/or a downhole tool to perform tasks as described herein. The processor 512 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 512 may be in communication with a main memory 517, such as via a bus 522 and/or other communication means. The main memory 517 may comprise a volatile memory 518 and a non-volatile memory 520. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or the non-volatile memory 520.

The processing system 500 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 524 may also comprise a graphics driver card. The interface circuit 524 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 526 may be connected to the interface circuit 524. One or more of the input devices 526 may permit a user to enter data and/or commands for utilization by the processor 512. Each input device 526 may be, comprise, or be implemented by a keyboard, a mouse, a touchscreen, a track-pad, a trackball, an image/code scanner, and/or a voice recognition system, among other examples.

One or more output devices 528 may also be connected to the interface circuit 524. One or more of the output devices

528 may be, comprise, or be implemented by a display device, such as a liquid crystal display (LCD), a light-emitting diode (LED) display, and/or a cathode ray tube (CRT) display, among other examples. One or more of the output devices 528 may also or instead be, comprise, or be implemented by a printer, speaker, and/or other examples.

The processing system 500 may also comprise a mass storage device 530 for storing machine-readable instructions and data. The mass storage device 530 may be connected to the interface circuit 524, such as via the bus 522. The mass storage device 530 may be or comprise a floppy disk drive, a hard disk drive, a compact disk (CD) drive, and/or digital versatile disk (DVD) drive, among other examples. The program code instructions 532 may be stored in the mass storage device 530, the volatile memory 518, the non-volatile memory 520, the local memory 514, and/or on a removable storage medium 534, such as a CD or DVD.

The mass storage device 530, the volatile memory 518, the non-volatile memory 520, the local memory 514, and/or the removable storage medium 534 may each be a tangible, non-transitory storage medium. The modules and/or other components of the processing system 500 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising an adjustable swing arm mechanically and electrically connected to a train rig operable in conjunction with the formation of a subterranean well extending beneath one of a plurality of wellsites, wherein: (A) the adjustable swing arm is extendable to different lengths between the train rig and at least one of a plurality of MV electrical hubs; (B) each MV electrical hub is electrically connected to a remote MV electrical power source via, at least, a plurality of MV electrical lines suspended above the wellsites; and (C) the adjustable swing arm comprises: (i) a plurality of conduit tubes connected end-to-end and rotatable relative to each other to extend to the different lengths; and (ii) an electrical cable carried by the conduit tubes for delivering MV electrical power from a connected one of the MV electrical hubs to the train rig.

The train rig may carry a plurality of equipment pieces operable in conjunction with the subterranean well formation, including first pieces of equipment that may be energized by the MV electrical power delivered by the adjustable swing arm. In such implementations, among others also within the scope of the present disclosure, each MV electrical hub may be operable to convert MV electrical power received from the MV electrical power source to LV electrical power, the adjustable swing arm may comprise an LV electrical cable carried by the conduit tubes for delivering LV electrical power from the connected one of the MV electrical hubs to the train rig, and the plurality of equipment pieces may include second pieces of equipment that may be energized by the LV electrical power delivered by the adjustable swing arm.

The adjustable swing arm may deliver MV electrical power to the train rig while the train rig is moving between different locations associated with corresponding different ones of the wellsites.

The MV electrical hubs may be periodically, and not continuously, arrayed along a predetermined path travelled by the train rig and including the different locations.

The suspended MV electrical lines may be uninsulated.

The MV electrical lines may be suspended by a plurality of first transmission towers, the apparatus may comprise a second transmission tower, and an end of the adjustable swing arm distal from the train rig may be attached to, and thus partially supported by, the second transmission tower. The second transmission tower may be portable, and the first transmission towers may not be portable.

The adjustable swing arm may be extendable in a two-dimensional plane via relative rotation of the conduit tubes in that plane. The plane may be either substantially parallel or substantially perpendicular to the ground surface at the wellsites.

The adjustable swing arm may comprise a snow and/or ice buildup remover. The snow and/or ice buildup remover may be remotely controllable via commands transmitted from a piece of equipment carried by the train rig.

The adjustable swing arm may be a first adjustable swing arm, the conduit tubes may be first conduit tubes, the electrical cable may be a first electrical cable, the connected one of the MV electrical hubs may be a first connected one of the MV electrical hubs, the apparatus may comprise a second adjustable swing arm mechanically and electrically connected to the train rig, the first and second adjustable swing arms may be extendable to different lengths between the train rig and different ones of the MV electrical hubs, and the second adjustable swing arm may comprise: a plurality of second conduit tubes connected end-to-end and rotatable relative to each other; and a second electrical cable carried by the second conduit tubes for delivering MV electrical power from a second connected one of the MV electrical hubs to the train rig.

The present disclosure also introduces a method comprising: conveying a train rig between locations associated with corresponding different ones of a plurality of wellsites, wherein equipment carried by the train rig is operable in conjunction with forming a plurality of wells each extending beneath a corresponding one of the wellsites, and wherein an adjustable swing arm mechanically and electrically connected to the train rig comprises an MV cable; extending the adjustable swing arm from the train rig to connect the MV cable to one of a plurality of MV electrical hubs each electrically connected to a remote MV electrical power source via, at least, a plurality of MV electrical lines suspended above the wellsites; and operating a piece of equipment carried by the train rig and energized by MV electrical power delivered via the adjustable swing arm.

The adjustable swing arm may comprise a plurality of conduit tubes connected end-to-end and rotatable relative to each other, the MV cable may be carried by the conduit tubes, and extending the adjustable swing arm may comprise rotating the conduit tubes relative to each other. The piece of equipment may be a first piece of equipment, each MV electrical hub may be operable to convert MV electrical power received from the MV electrical power source to LV electrical power; the adjustable swing arm may comprise an LV electrical cable carried by the conduit tubes for delivering LV electrical power from the connected one of the MV electrical hubs to the train rig, extending the adjustable swing arm from the train rig may also be to connect the LV electrical cable to the one MV electrical hub, and the method may also comprise operating a second piece of equipment carried by the train rig and energized by LV electrical power delivered via the adjustable swing arm.

The MV electrical lines may be suspended by a plurality of first transmission towers, and the method may further comprise positioning a second transmission tower between the train rig and the first transmission towers, wherein the one MV electrical hub may be vertically supported by the second transmission tower. Positioning the second transmission tower may comprise one or both of: adjusting a horizontal location of the second transmission tower relative to the train rig and the first transmission towers; and adjusting a vertical location of the one MV electrical hub vertically supported by the second transmission tower.

The adjustable swing arm may be a first adjustable swing arm, the conduit tubes may be first conduit tubes, the MV cable may be a first MV cable, the one MV electrical hub may be a first MV electrical hub, a second adjustable swing arm mechanically and electrically connected to the train rig may comprise a second MV cable, the method may comprise extending the second adjustable swing arm from the train rig to connect the second MV cable to a second one of the MV electrical hubs, and the operated piece of equipment may be energized by MV electrical power delivered via at least one of the first and second adjustable swing arms. Operating the piece of equipment may be performed while the first and second adjustable swing arms are both delivering MV electrical power to the train rig. Moving the train rig between the locations may be performed while at least one of the first and second adjustable arms is delivering MV electrical power to the train rig. The train rig may comprise a prime mover operable to move the train rig between the locations, and the MV electrical power delivered to the train rig may be utilized to electrically power the prime mover.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure. Moreover, implementations within the scope of the present disclosure include those having features shown in multiple figures, including implementations comprising one or more instances of a first feature shown in a first figure combined with one or more instances of a second feature shown in a second figure, even though the first feature is not shown or described in association with the second figure and/or the second feature is not shown or described in association with the first figure. Thus, the scope of the present disclosure includes implementations combining features collectively shown in two or more different figures or otherwise described herein, even though none of such figures independently show each feature in such combination.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   an adjustable swing arm mechanically and electrically connected to a train rig operable in conjunction with the formation of a subterranean well extending beneath one of a plurality of wellsites, wherein:
   the adjustable swing arm is extendable to different lengths between the train rig and at least one of a plurality of medium-voltage (MV) electrical hubs;
   each MV electrical hub is electrically connected to a remote MV electrical power source via, at least, a plurality of MV electrical lines suspended above the wellsites; and
   the adjustable swing arm comprises:
   a plurality of conduit tubes connected end-to-end and rotatable relative to each other to extend to the different lengths; and
   an electrical cable carried by the conduit tubes for delivering MV electrical power from a connected one of the MV electrical hubs to the train rig,
   wherein the plurality of MV electrical hubs is suspended by a plurality of first transmission towers,
   wherein the apparatus further comprises a second transmission tower, and
   wherein an end of the adjustable swing arm distal from the train rig is attached to, and thus partially supported by, the second transmission tower.

2. The apparatus of claim 1 wherein:
   the train rig carries a plurality of equipment pieces operable in conjunction with the subterranean well formation, including first pieces of equipment that are energized by the MV electrical power delivered by the adjustable swing arm;
   each MV electrical hub is operable to convert MV electrical power received from the MV electrical power source to low-voltage (LV) electrical power;
   the adjustable swing arm comprises an LV electrical cable carried by the conduit tubes for delivering LV electrical power from the connected one of the MV electrical hubs to the train rig; and
   the plurality of equipment pieces includes second pieces of equipment that are energized by the LV electrical power delivered by the adjustable swing arm.

3. The apparatus of claim 1 wherein the adjustable swing arm delivers MV electrical power to the train rig while the train rig is moving between different locations associated with corresponding different ones of the wellsites.

4. The apparatus of claim 1 wherein:
   the MV electrical hubs are periodically, and not continuously, arrayed along a predetermined path travelled by the train rig and including the different locations; and
   the suspended MV electrical lines are uninsulated.

5. The apparatus of claim 1 wherein the second transmission tower is portable and the first transmission towers are not portable.

6. The apparatus of claim 1 wherein the adjustable swing arm is extendable in a two-dimensional plane via relative rotation of the conduit tubes in that plane.

7. The apparatus of claim 6 wherein the plane is either substantially parallel or substantially perpendicular to the ground surface at the wellsites.

8. The apparatus of claim 1 wherein the adjustable swing arm comprises a snow and/or ice buildup remover.

9. The apparatus of claim 8 wherein the snow and/or ice buildup remover is remotely controllable via commands transmitted from a piece of equipment carried by the train rig.

10. An apparatus comprising:
an adjustable swing arm mechanically and electrically connected to a train rig operable in conjunction with the formation of a subterranean well extending beneath one of a plurality of wellsites,
wherein the adjustable swing arm is extendable to different lengths between the train rig and at least one of a plurality of medium-voltage (MV) electrical hubs,
wherein each MV electrical hub is electrically connected to a remote MV electrical power source via, at least, a plurality of MV electrical lines suspended above the wellsites,
wherein the adjustable swing arm comprises:
- a plurality of conduit tubes connected end-to-end and rotatable relative to each other to extend to the different lengths; and
- an electrical cable carried by the plurality of conduit tubes for delivering MV electrical power from a connected one of the MV electrical hubs to the train rig, wherein the adjustable swing arm is a first adjustable swing arm, the conduit tubes are first conduit tubes, the electrical cable is a first electrical cable, and the connected one of the MV electrical hubs is a first connected one of the MV electrical hubs,
wherein the apparatus comprises a second adjustable swing arm mechanically and electrically connected to the train rig,
wherein the first and second adjustable swing arms are extendable to different lengths between the train rig and different ones of the MV electrical hubs, and
wherein the second adjustable swing arm comprises:
a plurality of second conduit tubes connected end-to-end and rotatable relative to each other; and
a second electrical cable carried by the second conduit tubes for delivering MV electrical power from a second connected one of the MV electrical hubs to the train rig.

11. A method comprising:
conveying a train rig between locations associated with corresponding different ones of a plurality of wellsites, wherein equipment carried by the train rig is operable in conjunction with forming a plurality of wells each extending beneath a corresponding one of the wellsites, and wherein an adjustable swing arm mechanically and electrically connected to the train rig comprises a medium-voltage (MV) cable;
extending the adjustable swing arm from the train rig to connect the MV cable to one of a plurality of MV electrical hubs each electrically connected to a remote MV electrical power source via, at least, a plurality of MV electrical lines suspended above the wellsites,
wherein the plurality of MV electrical lines is suspended by a plurality of first transmission towers;
positioning a second transmission tower between the train rig and the plurality of first transmission towers,
wherein the one MV electrical hub is vertically supported by the second transmission tower; and
operating a piece of equipment carried by the train rig and energized by MV electrical power delivered via the adjustable swing arm.

12. The method of claim 11 wherein:
the adjustable swing arm comprises a plurality of conduit tubes connected end-to-end and rotatable relative to each other;
the MV cable is carried by the conduit tubes; and
extending the adjustable swing arm comprises rotating the conduit tubes relative to each other.

13. The method of claim 12 wherein:
the piece of equipment is a first piece of equipment;
each MV electrical hub is operable to convert MV electrical power received from the MV electrical power source to low-voltage (LV) electrical power;
the adjustable swing arm comprises an LV electrical cable carried by the conduit tubes for delivering LV electrical power from the connected one of the MV electrical hubs to the train rig;
extending the adjustable swing arm from the train rig is also to connect the LV electrical cable to the one MV electrical hub; and
the method also comprises operating a second piece of equipment carried by the train rig and energized by LV electrical power delivered via the adjustable swing arm.

14. The method of claim 11 wherein positioning the second transmission tower comprises:
adjusting a horizontal location of the second transmission tower relative to the train rig and the first transmission towers; and
adjusting a vertical location of the one MV electrical hub vertically supported by the second transmission tower.

15. The method of claim 11 wherein:
the adjustable swing arm is a first adjustable swing arm, the conduit tubes are first conduit tubes, the MV cable is a first MV cable, the one MV electrical hub is a first MV electrical hub, and a second adjustable swing arm mechanically and electrically connected to the train rig comprises a second MV cable;
the method comprises extending the second adjustable swing arm from the train rig to connect the second MV cable to a second one of the MV electrical hubs; and
the operated piece of equipment is energized by MV electrical power delivered via at least one of the first and second adjustable swing arms.

16. The method of claim 15 wherein operating the piece of equipment is performed while the first and second adjustable swing arms are both delivering MV electrical power to the train rig.

17. The method of claim 15 wherein moving the train rig between the locations is performed while at least one of the first and second adjustable arms is delivering MV electrical power to the train rig.

18. The method of claim 17 wherein:
the train rig comprises a prime mover operable to move the train rig between the locations; and
the MV electrical power delivered to the train rig is utilized to electrically power the prime mover.

* * * * *